(12) United States Patent
Narasimhan et al.

(10) Patent No.: US 8,626,165 B1
(45) Date of Patent: Jan. 7, 2014

(54) DYNAMIC CARRIER SWITCHING

(75) Inventors: Subram Narasimhan, Saratoga, CA (US); Girish Bansilal Bajaj, Bellevue, WA (US); Siva Rama Kumar Somayajula, Palo Alto, CA (US); Clifton Liu, Santa Clara, CA (US); Varadarajan Gopalakrishnan, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 461 days.

(21) Appl. No.: 12/708,483

(22) Filed: Feb. 18, 2010

(51) Int. Cl.
*H04W 4/00* (2009.01)
*H04W 36/00* (2009.01)
*H04M 3/00* (2006.01)
*H04W 24/00* (2009.01)
*H04L 12/26* (2006.01)
*H04M 1/00* (2006.01)

(52) U.S. Cl.
USPC ..... 455/435.2; 455/439; 455/418; 455/456.3; 455/552.1; 370/331; 370/338; 370/465; 370/252

(58) Field of Classification Search
USPC ........... 455/435.2, 436, 418–420, 426.1, 423, 455/432.1–452.1, 456.1–457, 404.1–404.2, 455/552.1; 370/331, 338, 465, 252
See application file for complete search history.

(56) References Cited

U.S. PATENT DOCUMENTS

| | | | |
|---|---|---|---|
| 5,503,084 A | 4/1996 | Goding et al. | |
| 5,534,888 A | 7/1996 | Lebby et al. | |
| 5,566,098 A | 10/1996 | Lucente et al. | |
| 5,603,084 A | 2/1997 | Henry, Jr. et al. | |
| 5,663,748 A | 9/1997 | Huffman et al. | |
| 5,761,485 A | 6/1998 | Munyan | |
| 5,847,698 A | 12/1998 | Reavey et al. | |
| 5,887,253 A | 3/1999 | O'Neil et al. | |
| 5,999,811 A | 12/1999 | Molne | |
| 6,341,270 B1 | 1/2002 | Esposito et al. | |
| 6,393,298 B1 | 5/2002 | Fulton | |
| 6,879,825 B1 | 4/2005 | Daly | |
| 6,915,272 B1 | 7/2005 | Zilliacus et al. | |
| 6,947,922 B1 | 9/2005 | Glance | |
| 7,009,596 B2 | 3/2006 | Seet et al. | |
| 7,027,575 B1 | 4/2006 | Burgess | |
| 7,298,851 B1 | 11/2007 | Hendricks et al. | |
| 7,304,635 B2 | 12/2007 | Seet et al. | |
| 7,350,704 B2 | 4/2008 | Barsness et al. | |
| 7,694,874 B2 | 4/2010 | Narasimhan et al. | |
| 2002/0037724 A1 | 3/2002 | Chatterjee et al. | |

(Continued)

FOREIGN PATENT DOCUMENTS

| | | |
|---|---|---|
| KR | 1020060128515 | 12/2006 |
| WO | WO 02/104062 | 12/2002 |

OTHER PUBLICATIONS

PCT International Search Report and Written Opinion for PCT Application No. PCT/US2008/057867, mailed Aug. 7, 2008, 3 pages.

(Continued)

*Primary Examiner* — Vladimir Magloire
*Assistant Examiner* — Michael Mapa
(74) *Attorney, Agent, or Firm* — Lowenstein Sandler LLP

(57) ABSTRACT

A rule server detects a condition pertaining to a switch of a user device to a preferred wireless carrier, and sends a message to the user device indicating a switch to the preferred wireless carrier.

29 Claims, 11 Drawing Sheets

(56) References Cited

U.S. PATENT DOCUMENTS

| | | |
|---|---|---|
| 2002/0066033 A1 | 5/2002 | Dobbins et al. |
| 2002/0128984 A1 | 9/2002 | Mehta et al. |
| 2002/0197991 A1* | 12/2002 | Anvekar et al. ............... 455/432 |
| 2003/0181219 A1 | 9/2003 | Huang |
| 2004/0033797 A1 | 2/2004 | Raivisto et al. |
| 2004/0064369 A1 | 4/2004 | Kato |
| 2004/0138958 A1 | 7/2004 | Watarai et al. |
| 2004/0192306 A1 | 9/2004 | Elkarat et al. |
| 2004/0236849 A1 | 11/2004 | Cooper et al. |
| 2004/0242209 A1 | 12/2004 | Kruis et al. |
| 2005/0107109 A1 | 5/2005 | Gunaratnam et al. |
| 2005/0182847 A1* | 8/2005 | Jawad Pirzada et al. ..... 709/233 |
| 2005/0186942 A1 | 8/2005 | Griffin |
| 2005/0202841 A1* | 9/2005 | Brobston et al. ........... 455/552.1 |
| 2006/0168123 A1 | 7/2006 | Krstulich |
| 2006/0259462 A1 | 11/2006 | Timmons |
| 2006/0281058 A1 | 12/2006 | Mangoaela |
| 2007/0011061 A1 | 1/2007 | East |
| 2007/0015510 A1* | 1/2007 | Xiang ........................... 455/436 |
| 2007/0015538 A1 | 1/2007 | Wang |
| 2007/0275717 A1* | 11/2007 | Edge et al. .................... 455/434 |
| 2008/0126586 A1 | 5/2008 | Shih |
| 2008/0132229 A1 | 6/2008 | Oommen et al. |
| 2008/0164304 A1 | 7/2008 | Narasimhan et al. |
| 2008/0171532 A1 | 7/2008 | Shieh et al. |
| 2009/0149175 A1* | 6/2009 | Lopresti et al. ................ 455/433 |
| 2009/0185492 A1* | 7/2009 | Senarath et al. ............... 370/238 |
| 2009/0215447 A1* | 8/2009 | Catalano et al. ........... 455/432.1 |
| 2010/0192212 A1 | 7/2010 | Raleigh |

OTHER PUBLICATIONS

PCT International Search Report and Written Opinion for PCT Application No. PCT/US2007/089123, mailed Jun. 27, 2008, 4 pages.

USPTO Office Action for U.S. Appl. No. 12/708,476 mailed Dec. 8, 2011.

USPTO Office Action for U.S. Appl. No. 12/708,488 mailed Apr. 27, 2012.

USPTO Office Action for U.S. Appl. No. 12/708,476 mailed May 24, 2012.

Uspto Office Action for U.S. Appl. No. 12/708,488 mailed Oct. 2, 2012.

* cited by examiner

DYNAMIC CARRIER SWITCHING

FIELD OF INVENTION

Embodiments of the invention relate to user devices, and more particularly to dynamically switching user devices to preferred wireless carriers.

BACKGROUND OF THE INVENTION

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistants (PDAs), portable media players, tablet computers, netbooks, and the like. As the quantity of available electronic media content continues to grow, along with increasing proliferation of devices to consume that media content, providing network connectivity for such user devices in a cost efficient manner continues to be a priority.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Methods and systems for dynamically switching user devices to preferred wireless carriers are described. User devices may be any content rendering devices including, for example, electronic book readers, cellular telephones, personal digital assistants (PDAs), portable media players, tablet computers, netbooks, and the like.

In one embodiment, a server computer system ("server") detects a condition triggering a rule that requires or recommends a switch to a specified wireless carrier. The rule may be based on one or more performance characteristics (throughput, signal strength, network load, etc.) of the specified wireless carrier and/or one or more cost characteristics (billing rate, surcharge, etc.) of the specified wireless carrier. In response to the detected condition, the server identifies one or more user devices to which the rule is applicable, and sends the message to each of these user devices, requesting or recommending a switch to the specified wireless carrier. In some embodiments, the server also sends a device profile of the specified wireless carrier to the user device. In other embodiments, the user devices store device profiles of various carriers including the device profile of the specified carrier and therefore do not need to receive the device profile from the server. In response to the message from the server, the user device reprograms its modem using the device profile of the specified wireless carrier, and establishes a network connection using the device profile of the specified wireless carrier. In another embodiment, in response to the message from the server, the user device determines whether to follow the recommendation of the server, and if this determination is positive, the user device reprograms the modem using the device profile of the specified wireless carrier, and establishes a network connection using the device profile of the specified wireless carrier.

In alternative embodiments, a switch to a different wireless carrier is initiated by a user device itself. In particular, a user device may contain a subset of rules that specify conditions for carrier switching. These conditions may include, for example, a change in the user device location, a denial of network access via a current wireless carrier, a change in a performance characteristic, etc.

Accordingly, embodiments of the invention facilitate dynamic switching of user devices to preferred wireless carriers. Dynamic switching consumes only a small amount of time and client resources and does not require any user interaction. As a result, the cost associated with network connectivity is significantly reduced, and network access performance characteristics are improved.

Figure 1:
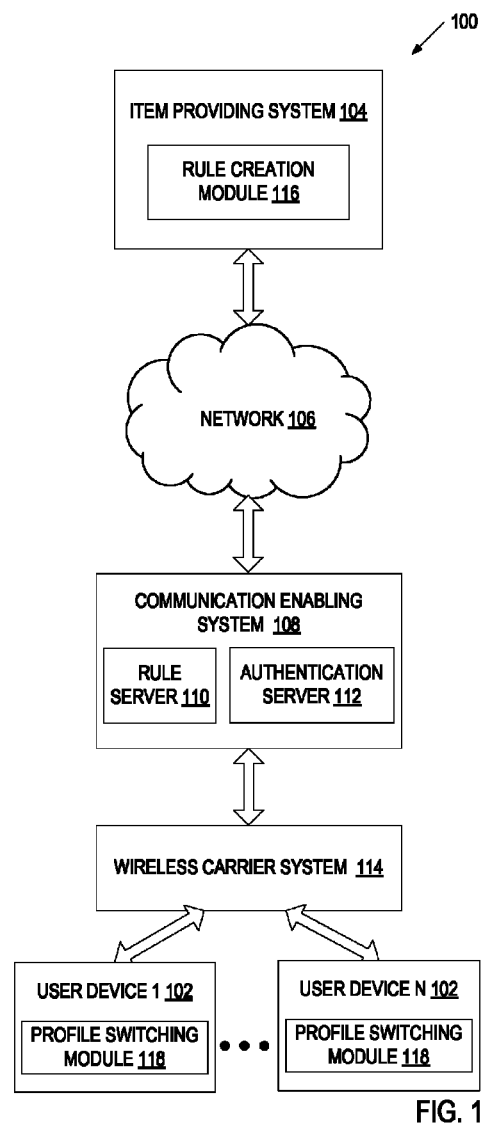
FIG. 1 is a block diagram of exemplary network architecture in which embodiments of the invention may operate.

FIG. 1 is a block diagram of an exemplary network architecture 100 in which embodiments of the invention may operate. The network architecture 100 may include an item providing system 104 and multiple user devices 102 coupled to the item providing system 104 via a network 106.

The user devices 102 are variously configured with different functionality to enable consumption of one or more types of media items. The media items may be any type or format of digital content, including, for example, electronic texts (eBooks, electronic magazines, digital newspapers, etc.), digital audio (music, audible books, etc.), digital video (movies, television, short clips, etc.), images (art, photographs, etc.), and multi-media content. The user devices 102 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 104 downloads items, upgrades, and/or other information to the user devices 102 via the network 106. The item providing system 104 also receives various requests, instructions and other data from the user devices 102 via the network 106. The item providing system 104 may include one or more machines (one or more server computer systems, routers, gateways, etc.) that have processing and storage capabilities to provide the above functionality.

In the illustrated implementation, communication between the item providing system 104 and the user device 102 is enabled via a communication infrastructure that includes a combination of a wide area network (WAN) 106 and wireless infrastructure, which allows a user to use the user device 102 to purchase items and consume items without being tethered to the item providing system 104 via hardwired links. The wireless infrastructure is provided by a wireless carrier system 114 that can be implemented using various data processing equipment, communication towers, etc. Alternatively, or in addition, the wireless carrier system 114 may rely on WiFi or satellite technology to exchange information with the user device 102.

The communication infrastructure also includes a communication-enabling system 108 that serves as an intermediary in passing information between the item providing system 104 and the wireless carrier. The communication-enabling system 108 may communicate with the wireless carrier system 114 via a dedicated channel, and may communicate with the item providing system 104 via a non-dedicated communication mechanism, e.g., a public network such as the Internet. By virtue of this intermediary role, the communication enabling system 108 may be referred to as a Mobile Virtual Network Enabler (MVNE), while the item providing system 104 may be referred to as a Mobile Virtual Network Operator (MVNO).

The item providing system 104 may pay the wireless carrier a fee based on the aggregate use of the wireless carrier system 114 by all of the user devices 102. The item providing system 104 may recoup these costs through fees charged to the end-users separately or as part of other purchases (e.g., purchase of digital content) made by the end-users. Alternatively, the wireless carrier may submit bills directly to individual users, or may submits bills to either the item providing system 104 (in aggregate) or to the individual users, at the option of the individual respective users.

A user device 102 may be associated with a specific wireless carrier by means of subscriber identity module (SIM) data that may be stored on a physical SIM card or included in a SIM profile. The SIM data includes information identifying the user device to the specific wireless carrier. This information may include a unique international mobile subscriber identity (IMSI) containing a mobile country code (MCC), a mobile network code (MNC) and a mobile station identification number (MSIN) within the wireless carrier's customer base. The SIM data may also include security authentication and ciphering information, temporary information related to the local network, a list of the services the user has access to, etc. In addition to the association via SIM data, a wireless modem of a user device may be pre-configured with a modem profile that defines network connection parameters for a relevant wireless carrier.

Depending on the location of the user device 102, the wireless carrier that the user device 102 is associated with may not be a preferred carrier in terms of existing contracts with the item providing system 104 or the end-user, billing rates and/or provided performance characteristics (coverage, signal strength, speed network load, etc.). Hence, the device's network usage can result in increased costs (e.g., roaming charges or higher billing rates) and/or undesirable performance.

Embodiments of the invention overcome the above shortcomings by supporting dynamic switching of user devices to preferred wireless carriers. The modem of the user device is programmed with a SIM profile that includes settings of a currently-used wireless carrier such as the IMSI, security authentication and ciphering information, etc. When a switch to a preferred wireless carrier is triggered, the modem is automatically re-programmed with the SIM profile of the preferred wireless carrier. In addition, in some embodiments, the modem is also reconfigured with a modem profile that defines connection parameters for the preferred wireless carrier, such as a GSM frequency band parameter, the format for presenting the wireless carrier name on the user device, etc.

A switch to a preferred wireless carrier may be initiated upon detecting a condition that triggers a rule or detecting a parameter that exceeds a threshold. Various rules and/or thresholds may be maintained based on cost and performance characteristics pertaining to different wireless carriers. The cost characteristics may include, for example, billing rates, surcharges, initial fees and other charges of a wireless carrier. The performance characteristics may include, for example, availability of coverage, throughput, signal strength, network load, etc.

In some embodiments, the item providing system 104 hosts a rule creation module 116 that collects the above characteristics and creates rules and/or thresholds based on these characteristics. A rule may request a user device 102 to perform a switch, or a rule may provide a recommendation (suggestion or guideline) with respect to a switch and a user device 102 may further decide whether to follow the recommendation or not. For example, a rule may require/recommend a switch from carrier 1 to carrier 2 if the current billing rate of carrier 1 exceeds the current billing rate of carrier 2 by at least X amount. In another example, a rule may require/recommend a switch from carrier 1 to carrier 2 if the signal strength of carrier 2 exceeds the signal strength of carrier 1 by Y dBm. In yet another example, a rule may require/recommend a switch from carrier 1 to carrier 2 if the current billing rate of carrier 1 exceeds the current billing rate of carrier 2 by at least X amount, and the signal strength of carrier 1 does not exceed the signal strength of carrier 2 by more than Y dBm.

The rules and/or thresholds created by the rule creation module 116 can be enforced by a rule server 110 that is hosted by the communication enabling system 106. In alternative embodiments, the rule server 110 can be hosted by the item providing system 104 or by any other system capable of communicating with the user devices 102. The rule server 110 detects conditions that trigger the above rules and/or cause the above thresholds to be exceeded. The conditions may include, for example, a change in a fee charged by a wireless carrier, a change in a location of a user device, a change in a performance characteristic of a network of a wireless carrier, a change in a contractual agreement between the item providing system 104 and a wireless carrier, etc.

When a rule is triggered (or a threshold is exceeded), the rule server 110 identifies user devices 102 to which the rule or threshold is applicable, and sends a message to the identified user devices requesting them to switch to an alternative wireless carrier. In one embodiment, the rule server 110 also sends a device profile of the alternative wireless carrier to the user device. In another embodiment, the rule server 110 sends an identifier of the alternative wireless carrier to the user device, and the user device obtains the device profile from its local memory.

Upon receiving a request to switch from the rule server 110, the user device 102 performs the requested switch. If the message of the rule server 110 indicates a recommendation to switch (as opposed to a request to switch), the user device 102 may or may not perform the recommended switch depending on further evaluation of local conditions, user preferences or other local data. In one embodiment, the user device 102 includes a profile switching module 118 that obtains a device profile of the alternative wireless carrier and reprograms the modem using the obtained device profile to enable the user device 102 to connect to the network via the alternative wireless carrier. In some embodiments, the profile switching module 118 maintains a subset of rules and initiates carrier switching of the user device 102 when any rule form the subset is triggered, without waiting for a request from the rule server 110. The actual switch to the alternative wireless carrier may not occur during a current session but rather after the current session is completed, making it transparent to the user.

In one embodiment, the communication enabling system 108 includes an authentication server 112 that performs security-related functions. In particular, the authentication server 112 ensures that the user device 102 currently attempting to interact with the item providing system 104 is duly authorized to access the item providing system 104. In some embodiments, the authentication server 112 is configured to deny access to the item providing system 104 for user devices that are connected via a non-preferred carrier. When a user device 102 receives a message indicating that it was denied access to the item providing system 104, the user device 102 examines the local subset of rules to identify the next carrier in a preferred carrier list or asks the rule server to identify a preferred carrier, and reprograms the modem to enable the switch to the identified carrier.

Figure 2:
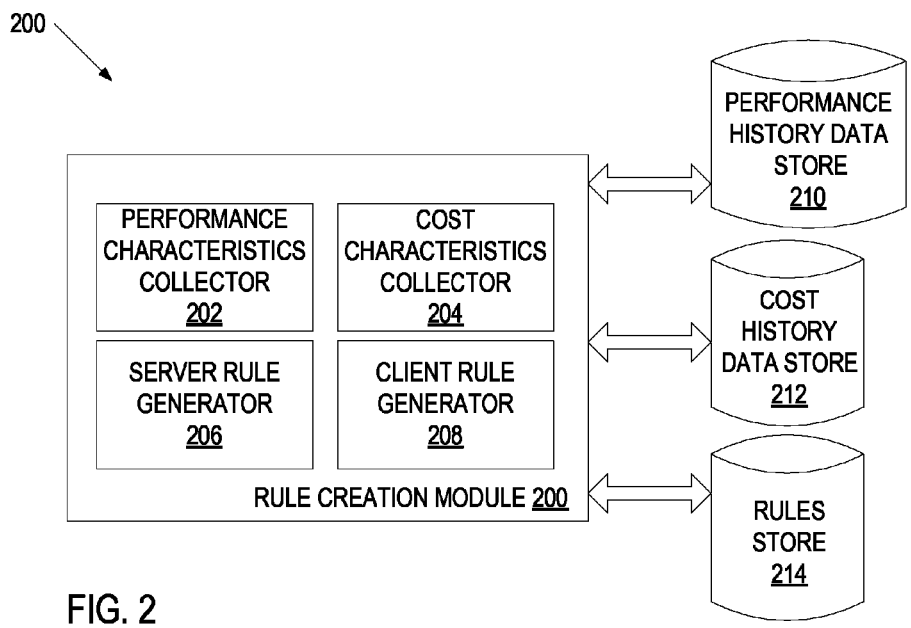
FIG. 2 is a block diagram of one embodiment of a rule creation module.

FIG. 2 is a block diagram of one embodiment of a rule creation module 200. The rule creation module 200 may be the same as the rule creation module 116 of FIG. 1 and may include a performance characteristics collector 202, a cost characteristics collector 204, a server rule generator 206, and a client rule generator 208. The components of the rule creation module 116 may represent modules that can be combined together or separated into further modules, according to some embodiments.

The performance characteristics collector 202 collects performance characteristics of different wireless carriers and stores them in a performance history data store 210. Performance characteristics of a wireless carrier may include, for example, information about network coverage at different locations, throughput provided at different locations and on different days/times, signal strength provided at different locations and on different days/times, etc. In addition, the performance characteristics collector 202 may collect performance characteristics pertaining to individual user devices and store them in a performance history data store 210. Performance characteristics pertaining to a user device may include, for example, information about network usage by the user device, throughput and signal strength during network usage at typical user locations (e.g., house, work, gym), user preferences of wireless carriers at typical user locations, etc.

The cost characteristics collector 204 collects cost characteristics of different wireless carriers and stores them in a cost history data store 210. Cost characteristics of a wireless carrier may include, for example, billing rates charged at different locations and on different days/times, discount information, initial fees, surcharges, etc.

The server rule generator 206 creates rules and/or thresholds based on the collected performance and cost characteristics, and stores the created rules in a rules store 214. A rule may, for example, require or recommend a switch if the billing rate of a current wireless carrier is at least 5 percent higher than the billing rate of another wireless carrier providing coverage in the present location. Another rule may require or recommend a switch if a user travels to a new geographical area. Yet another rule may require or recommend a switch if a signal strength or throughput provided by an alternative wireless carrier is at least 10 percent better than those provided by the current wireless carrier. A rule may include multiple conditions using any combination of performance characteristics and/or cost characteristics. In addition, a rule may be carrier specific and applicable to all user devices (e.g., "any user device should switch to carrier A when arriving to city X"). Alternatively, a rule may be user device specific (e.g., "user device should switch to carrier A when at home and then switch to carrier B when arriving to the office"). The server rule generator 206 stores the created rules and/or thresholds in a rules store 214.

The client rule generator 208 creates rules and/or thresholds for individual user devices based on the collected performance and cost characteristics, and stores the created rules and/or thresholds in the rules store 214. These rules and/or thresholds may be specific to a user device or a group of user devices (user devices of all users working in a certain office of a specific company, all user devices of a specific device type (e.g., certain type of electronic book reader), all user devices supporting a specific network protocol, etc.). For example, a rule may require or recommend that a device of any user working from a Chicago office of company X switch to carrier A at 12 pm and then switch to carrier B at 4 pm. In another example, a rule may require or recommend that user device Y switch to carrier A when arriving to the office, switch to carrier B when arriving home, and switch to carrier C when arriving to the gym.

The server rule generator 206 and the client rule generator 208 periodically update the rules and/or thresholds based on newly collected data and send them to the rule server. In addition, in some embodiments, a subset of rules and/or thresholds may be provided to the individual user devices.

The data stores 210, 212 and 214 may represent a single or multiple data structures (databases, repositories, files, etc.) residing on one or more mass storage devices, such as magnetic or optical storage based disks, tapes or hard drives.

Figure 3:
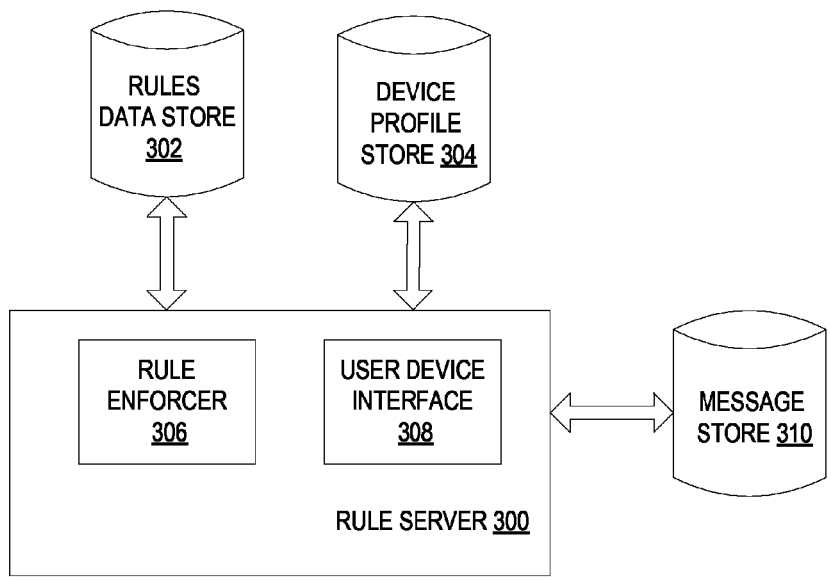
FIG. 3 is a block diagram of one embodiment of a rule server.

FIG. 3 is a block diagram of one embodiment of a rule server 300. The rule server 300 may be the same as the rule server 11 of FIG. 1 and may include a rule enforcer 308, a user device interface 308, a rules store 302, a device profile store 304, and a message store 310. The components of the rule server 300 may represent modules that can be combined together or separated into further modules, according to some embodiments.

The rule store 302 includes rules and/or thresholds created by the rule creation module 200 based on cost characteristics of different wireless carriers and/or based on performance characteristics of different wireless carriers and user devices. The rules may be carrier specific or user device specific.

The rule enforcer 306 enforces the rules and/or thresholds stored in the rules store 302. In particular, the rule enforcer 306 tracks what carriers are currently being used by user devices. For each current carrier, the rule enforcer 306 uses the rules and/or thresholds associated with this carrier to detect when the usage of this carrier by user devices becomes undesirable. The rule enforcer 306 then determines, based on relevant rule(s) and/or threshold(s), an alternative carrier that should be used instead of a current carrier, and identifies user devices to which these rules and/or thresholds are applicable.

The user device interface 308 is responsible for sending a message to the identified user devices, requesting or recommending that each of these user devices switch to the alternative carrier. In one embodiment, the user device interface 308 also retrieves a device profile associated with the alternative carrier from the device profile store 304 and sends this device profile to the user devices. The device profile store 304 may contain device profiles associated with different wireless carriers. Each device profile includes a SIM profile associated with a specific carrier, and optionally in some embodiments a modem profile that define network connection parameters for the specific wireless carrier. In another embodiment, the user device interface 308 does not send the device profile associated with the alternative carrier to the user device and the user device retrieves this device profile from a local device profile store.

In one embodiment, upon sending a switching message, the user device interface 308 stores the switching message in the message store 310 to keep track of all the switching messages. The user device interface 308 may check the contents of the message store 310 prior to sending a switching message to a user device to avoid frequent switching of the user device.

The rule enforcer 306 may also enforce user device specific rules and/or thresholds by monitoring activity associated with a specific user device and detecting conditions that trigger one or more rules pertaining to the specific user device or cause one or more thresholds pertaining to the specific user device to be exceeded. For example, if a rule requires or recommends that a user device switch from carrier A to carrier B when a user arrives to work, the rule enforcer 306 may monitor the location of the user device (e.g., using triangulation or other location detection techniques) to detect when the user arrives to work, and then invoke the user device interface 308 to send a message to the user device, requesting or recommending a switch.

The data stores 302, 304 and 306 may represent a single data structure (a repository, a database, etc.) or different data structures residing on one or more mass storage devices, such as magnetic or optical storage based disks, tapes or hard drives.

Figure 4:
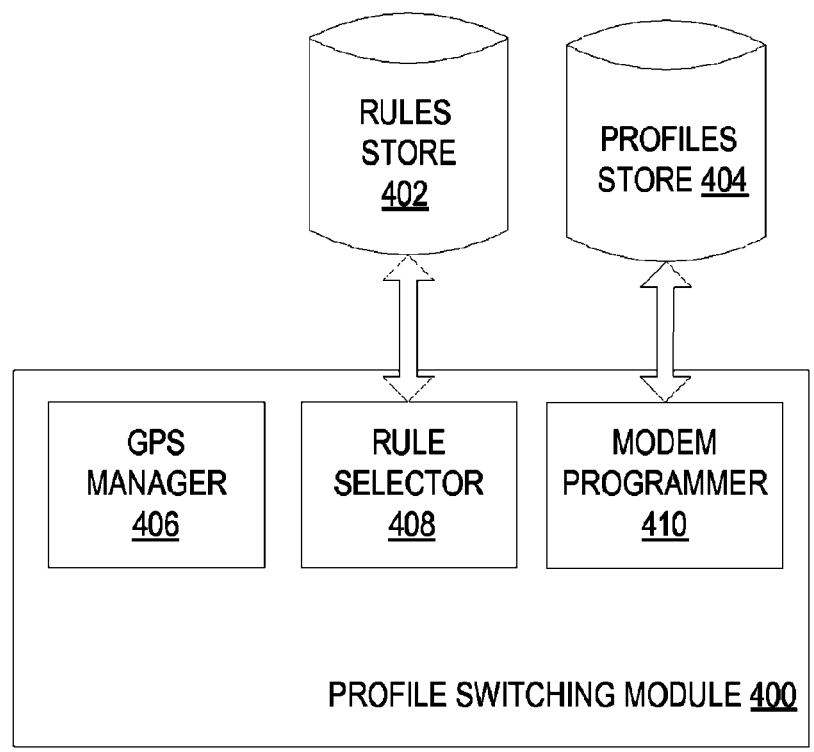
FIG. 4 is a block diagram of one embodiment of a profile switching module.

FIG. 4 is a block diagram of one embodiment of a profile switching module 400. The profile switching module 400 may be the same as the profile switching module 118 of FIG. 1 and may include a GPS manager 406, a rule selector 408 and a modem reprogrammer 410. The components of the profile switching module 400 may represent modules that can be combined together or separated into further modules, according to some embodiments.

The user device hosting the profile switching module 400 has a modem that is programmed with a SIM profile associated with a specific wireless carrier. The SIM profile may be stored in secure memory (e.g., one time programmable (OTP) memory) on the modem. In one embodiment, the modem is also configured with a modem profile that defines network connection parameters for the specific wireless network. The modem profile is stored in non-volatile memory on the modem.

When the profile switching module 400 receives a message from the rule server to switch to an alternative carrier, the modem reprogrammer 410 obtains a device profile of the alternative wireless carrier and reprograms the modem with the obtained device profile. This device profile includes a SIM profile and, in some embodiments, a modem profile of the alternative wireless carrier. The modem reprogrammer 410 can receive the device profile of the alternative wireless carrier from the rule server or retrieve it from a local profile store 404. The profile store 404 may include SIM profiles and modem profiles of various wireless carriers and can reside in a secure memory (e.g., secure OTP memory) on the modem. Optionally, the profiles in the data store 404 can be encrypted for additional security. If the profile store 404 does not include the device profile of the alternative wireless carrier, the modem reprogrammer 410 can request it from the rule server. The actual switch to the alternative wireless carrier may not occur during a current session but rather after the current session is completed, making it transparent to the user.

In some embodiments, when the profile switching module 400 receives a message from the rule server indicating a switch to an alternative carrier, the profile switching module 400 may or may not reprogram the modem with a different device profile depending on whether it decides to follow a recommendation of the rule server or not. This decision may be based on local conditions (e.g., network coverage at the current location, throughput provided at the current location, signal strength at the current location), user preferences and other local data.

In some embodiments, the profile switching module 400 initiates carrier switching itself, without waiting for a switching message from the rule server. In these embodiments, the profile switching module 400 may include the rule selector 408 that uses the rules and/or thresholds from a rules store 402 to initiate carrier switching. The rules store 402 may include, for example, location specific rules that require a switch to a certain carrier when the user arrives to a specific location. Changes in the user device location can be detected by the GPS manager 406 using a GPS technique. Alternatively, changes in the user device location can be detected using a triangulation technique, MCC and MNC data, etc.

In another example, the rule store 402 may include a rule specifying a preferred carrier list ordered by priority. When the authentication server 112 denies access to the item providing system 104 via a current wireless carrier, the rule selector 408 may select the next carrier in the preferred carrier list and invoke the modem reprogrammer 410 to perform the carrier switch.

Rules and/or thresholds 402 may be stored in memory on the modem or some other memory of the user device. Rules and/or thresholds 402 can be periodically updated by receiving data from the item providing system 104. For example, the preferred carrier list can be updated on a daily basis to re-prioritize based on daily rates.

Figure 5:
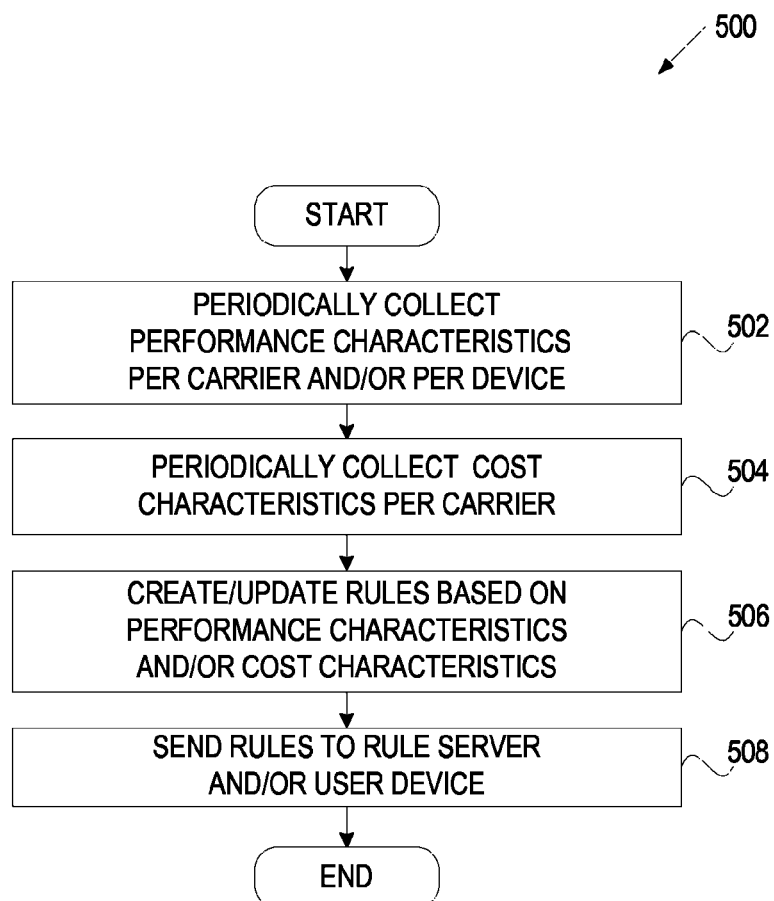
FIG. 5 is a flow diagram of one embodiment of a method for creating rules facilitating dynamic switching of user devices to preferred wireless carriers.

FIG. 5 is a flow diagram of one embodiment of a method 500 for creating rules facilitating dynamic switching of user devices to alternative wireless carriers. The method is performed by processing logic that may comprise hardware (circuitry, dedicated logic, etc.), software (such as is run on a general purpose computer system or a dedicated machine), or a combination of both. In one embodiment, embodiments of the method are performed by an item providing system 104 (e.g., a rule creation module 116 hosted by the item providing system 104 of FIG. 1).

Referring to FIG. 5, the rule creation module periodically collects performance characteristics per carrier and/or per device (blocks 502). As discussed above, performance characteristics of a wireless carrier may include, for example, information about network coverage at different locations, throughput provided at different locations and on different days/times, signal strength provided at different locations and on different days/times, etc. Performance characteristics pertaining to a user device may include, for example, information about network usage by the user device, throughput and signal strength during network usage at typical user locations (house, work, gym, etc.), user preferences of wireless carriers at typical user locations, etc.

At block 504, the rule creation module periodically collects cost characteristics per carrier. Cost characteristics of a wireless carrier may include, for example, billing rates charged at different locations and on different days/times, discount information, initial fees, surcharges, etc.

At block 506, the rule creation module creates rules and/or thresholds based on performance characteristics and/or cost characteristics. A rule may include one or more conditions using any combination of performance characteristics and/or cost characteristics. A rule or threshold may be carrier specific and applicable to all user devices, or a rule or threshold may be user device specific. The rule creation module periodically updates the rules and/or thresholds based on newly collected data.

In some embodiments, the rule creation module also creates rules and/or thresholds for switching between different delivery mechanisms or different communication channels within the same wireless network. For example, if a wireless carrier has higher billing rates for use of the multimedia messaging service (MMS) than the short message service (SMS) in a certain geographical area, a rule may require or recommend a switch from the SMS to the MMS when the user travels to this area.

At block 508, the rule creation module sends rules and/or thresholds to the rule server. In some embodiments, the rules creation module also sends to a user device a subset of the rules and/or thresholds that is relevant to the user device.

Figure 6:
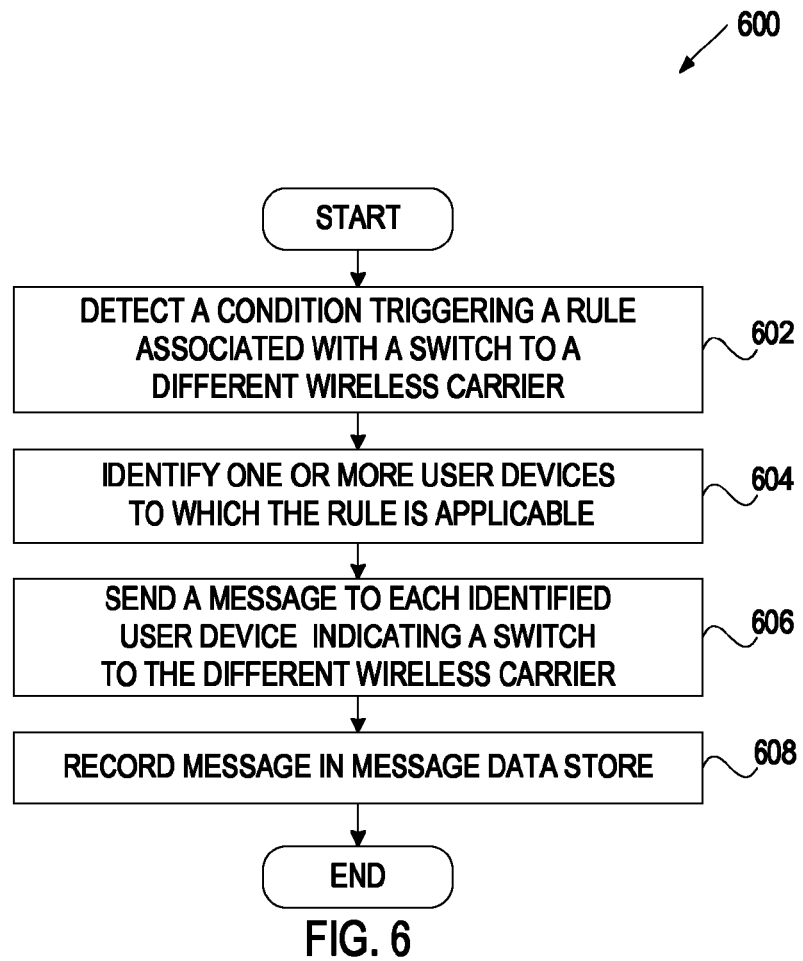
FIG. 6 is a flow diagram of one embodiment of a method for facilitating a dynamic switch of a user device to a preferred wireless carrier.
Figure 7:
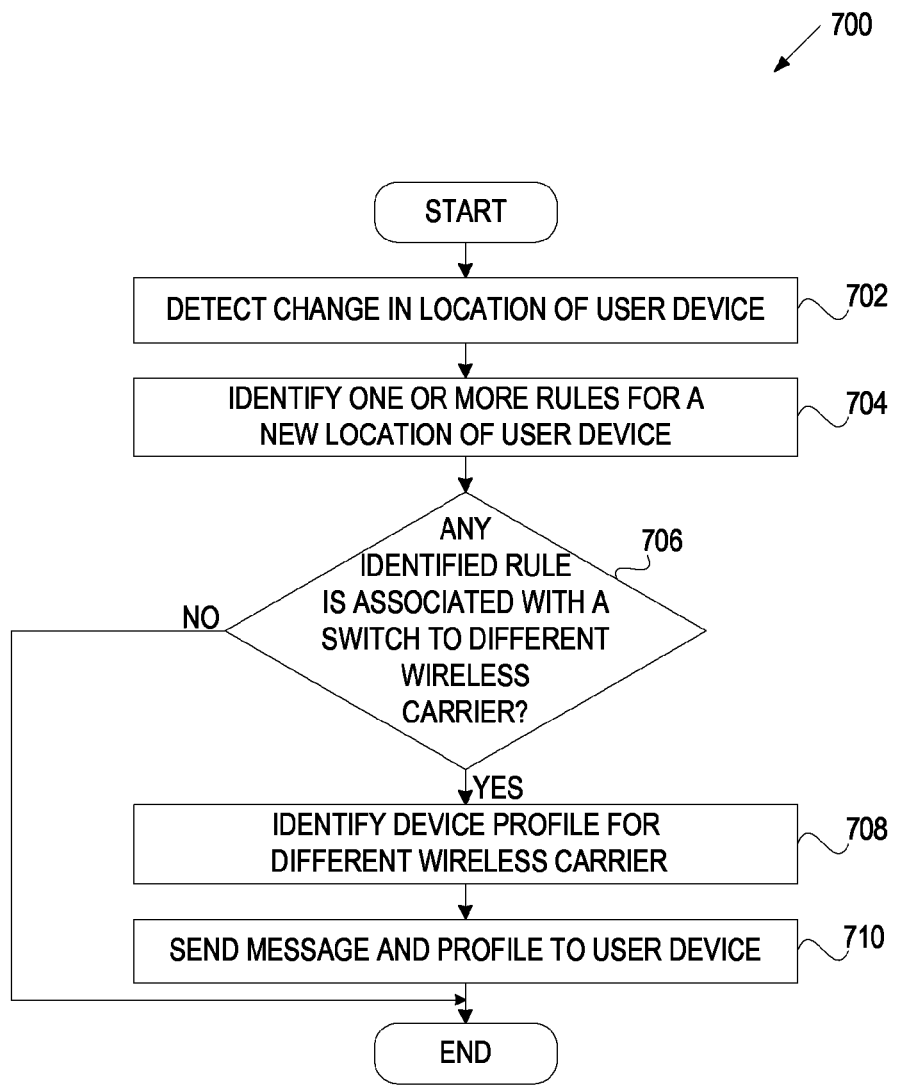
FIG. 7 is a flow diagram of one embodiment of a method for facilitating a switch of a user device to a different wireless carrier in response to a change in the location of the user device.
Figure 8:
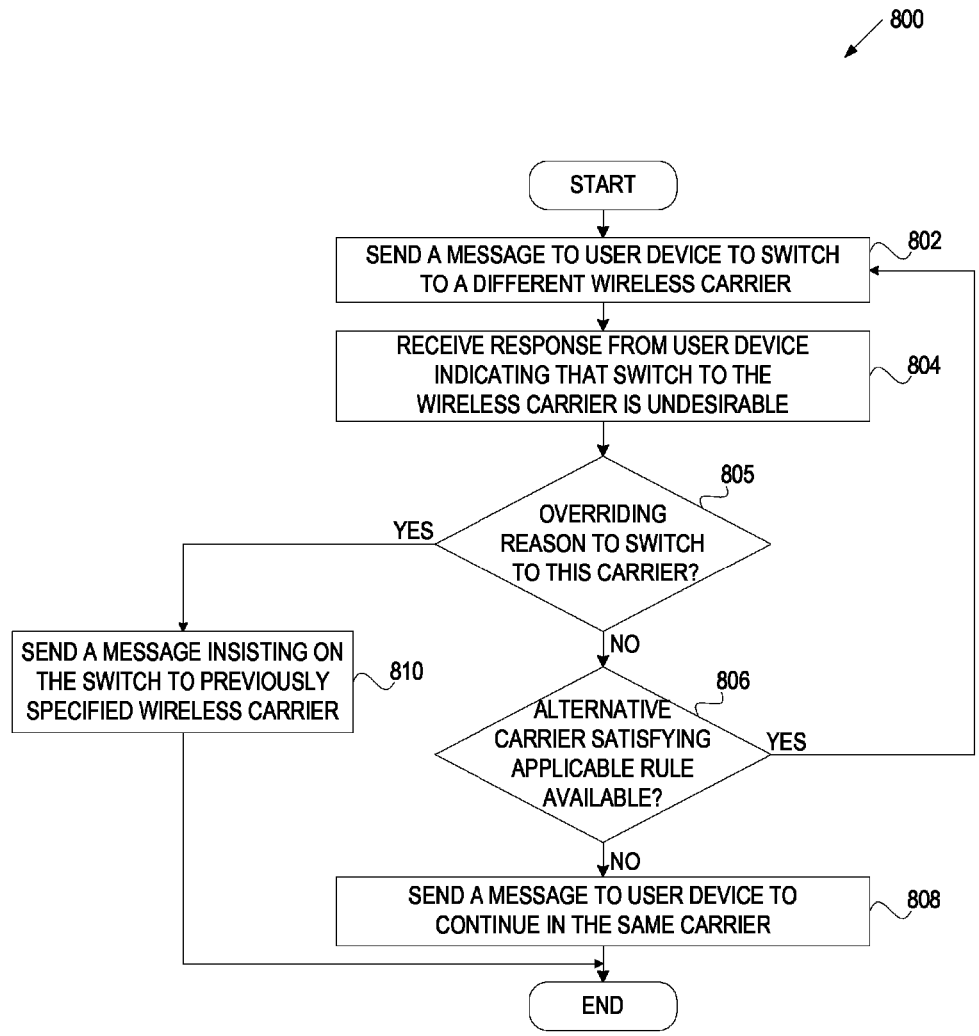
FIG. 8 is a flow diagram of one embodiment of a method for facilitating a switch of a user device to a different wireless carrier using preferences of a user.

FIGS. 6, 7 and 8 are flow diagrams of some embodiments of a method for facilitating a dynamic switch of a user device to a different wireless carrier. The method is performed by processing logic that may comprise hardware (circuitry, dedicated logic, etc.), software (such as is run on a general purpose computer system or a dedicated machine), or a combination of both. In one embodiment, embodiments of the method are performed by a computer system hosting a rule server (e.g., a rule server 110 of FIG. 1).

Referring to FIG. 6, the rule sever receives various carrier switching rules and/or thresholds from the item providing system and stores them in a rules store. At block 602, the rule server detects a condition triggering one of the rules from the rule store or causing one or more threshold from the rule store to be exceeded. At block 604, the rule server identifies one or more user devices to which the rule or threshold is applicable. For example, if the rule requests or recommends a switch to carrier A for all devices located in area X, the rule server identifies all user devices in area X that are presently using a wireless carrier other than carrier A.

At block 606, the rule server sends a message to each identified user device to request or recommend a switch to the preferred wireless carrier. In one embodiment, the rule server also retrieves a device profile associated with the preferred wireless carrier from a device profile store and sends this device profile to the user devices. The device profile includes a SIM profile associated with the preferred wireless carrier, and optionally in one embodiment a modem profile that define network connection parameters for the preferred wireless carrier. In another embodiment, the rule server sends the identifier of the device profile associated with the preferred carrier to the user device but not the device profile itself.

At block 608, the rule server stores the switching message in a message store. In one embodiment, prior to sending a message to the user device, the rule server determines how many times the user device was requested or recommended to switch over the last N hours or when the last switch of the user device took place. If the number of switches or requests/recommendations exceeds a predefined threshold or the last switch has occurred (or a request/recommendation was sent) less than a predefined number of hours ago, the rule server does not send a switching message to the user device.

In one embodiment, several device profiles may be maintained for a single wireless carrier, each of these device profiles corresponding to a different delivery mechanism or a different communication channel within the same wireless network. For example, one device profile may correspond to the use of MMS while connecting to a specific wireless network and another device profile may correspond to the use of SMS while connecting to the same wireless network. The rule server can maintain rules and/or thresholds to initiate or recommend a switch to a preferred delivery mechanism or communication channel when a specific condition occurs. When the rule server detects a condition triggering one of the above rules or causing one of the above thresholds to be exceeded, the rule server identifies user devices to which this rule or threshold applies, and sends these user devices a message, requesting or recommending that the user devices switch to a preferred delivery mechanism or communication channel. The user devices can then reprogram their modems with the device profile associated with the preferred delivery mechanism or communication channel.

FIG. 7 is a flow diagram of one embodiment of a method 700 for facilitating a switch of a user device to a different wireless carrier in response to a change in the location of the user device. Method 700 begins with the rule server detecting a change in location of a user device (block 702). The change in location can be detected using triangulation or other location detection techniques.

At block 704, the rule server identifies one or more rules and/or thresholds relevant to the new location of the user device. At block 706, the rule server determines whether any identified rule or threshold necessitates or recommends a switch to a different wireless carrier. If so, the rule server identifies the device profile for the different wireless carrier (block 708) and sends a switching message and the device profile to the user device (block 710). Otherwise, if there are no rules thresholds necessitating or recommending a switch to a different wireless carrier, method 700 ends.

FIG. 8 is a flow diagram of one embodiment of a method 800 for facilitating a switch of a user device to a different wireless carrier using user device preferences. Method 800 begins with the rule server sending a message to a user device indicating a switch to a different wireless carrier. At block 804, the rule server receives a response from the user device indicating that the switch to the specified wireless carrier is undesirable. The reason for such a response may be user preferences with respect to wireless carriers or performance characteristics collected by the user device.

At block 805, the rule server determines whether there are any overriding reasons necessitating a switch to the specified wireless carrier (e.g., requirements of a service contract between the specified wireless carrier and the item providing system, a significant billing rate difference between the current wireless carrier and the new wireless carrier, etc.). If there is an overriding reason to switch to the new wireless carrier, the rule server sends a message insisting on the switch to the previously specified wireless carrier (block 810). Otherwise, the rule server further determines whether an alternative wireless carrier is available that satisfies the applicable rule (block 806). If so, the method returns to block 802. If not, the rule server sends a message to the user device to continue using the existing wireless carrier (block 808).

Figure 9:
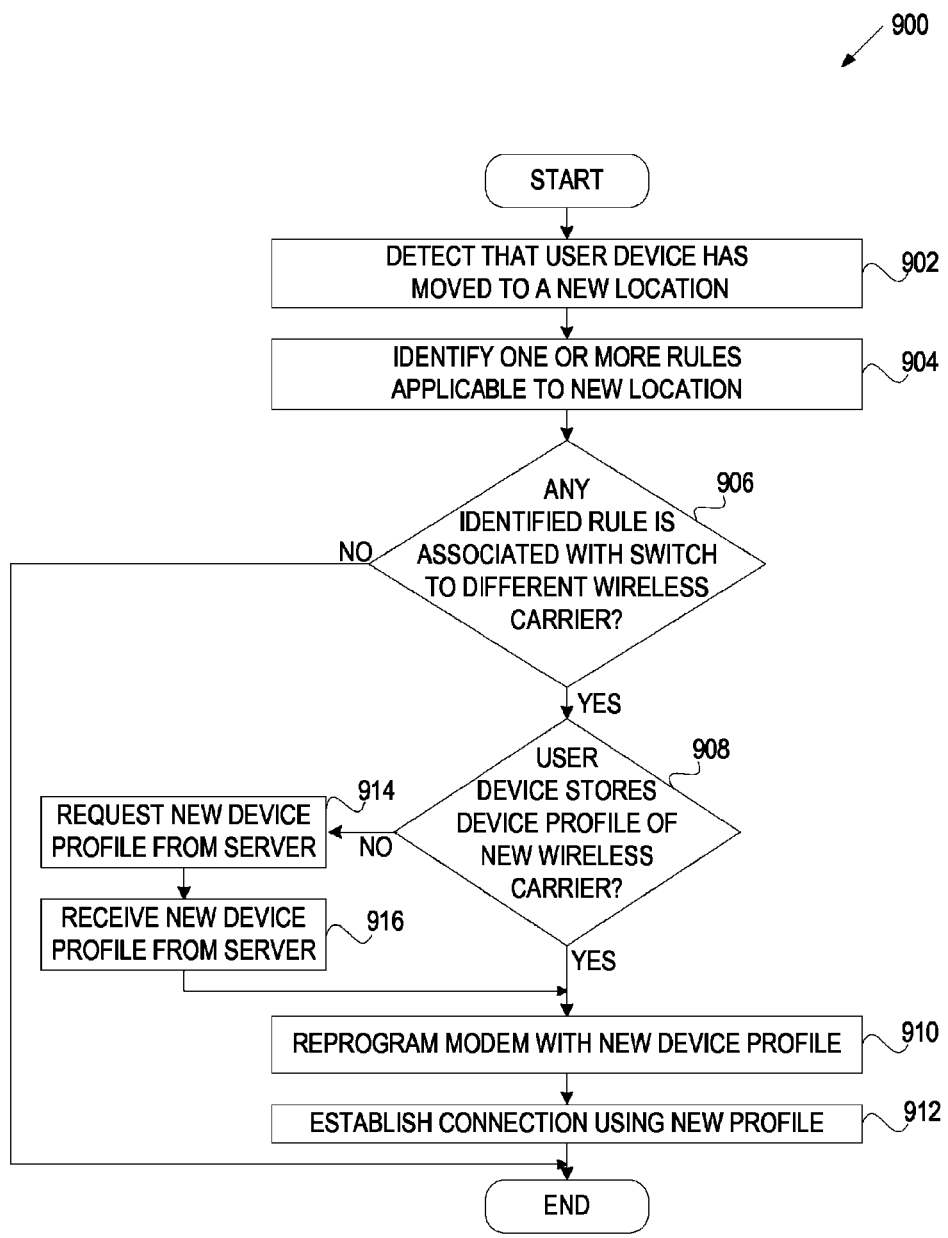
FIG. 9 is a flow diagram of one embodiment of a method for dynamically switching a user device to a preferred local carrier at a new location of the user device.
Figure 10:
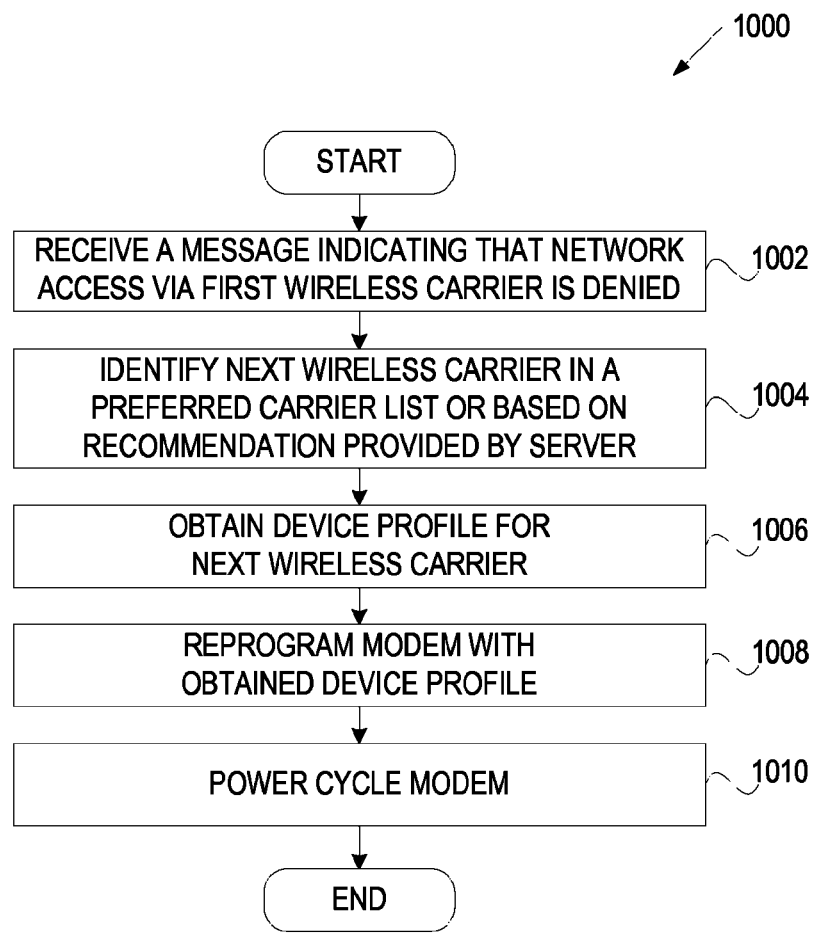
FIG. 10 is a flow diagram of one embodiment of a method for dynamically switching a user device to a different wireless carrier using a priority list maintained by the user device.

FIGS. 9 and 10 are flow diagrams of some embodiments of a client-side method for switching to a different wireless carrier. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., a profile switching module 118 hosted by the user device 102 of FIG. 1).

Referring to FIG. 9, method 900 begins with detecting that the user device has moved to a new location. The change in location can be detected using GPS hosted by the user device, a triangulation technique, MCC/MNC data, etc.

At block 904, the user device identifies one or more rules applicable to the new location using a subset of rules stored in local memory. At block 906, the user device determines whether any identified rule indicates a switch to a preferred wireless carrier. If not, method 900 ends. If so, the user device determines whether the user device contains a device profile of the preferred wireless carrier (block 908).

If the user device contains the device profile of the preferred wireless carrier, the user device reprograms the modem with this device profile (block 910) and establishes a network connection using the device profile of the preferred wireless carrier. In one embodiment, the user device power cycles the modem to implement profile changes prior to establishing the network connection.

If the user device does not contain the device profile of the preferred carrier, the user device requests this device profile from the rule server (block 914), receives this device profile from the rules server (block 916), reprograms the modem with this device profile (block 910), and establishes a network connection using the device profile of the preferred wireless carrier.

Referring to FIG. 10, method 1000 begins with user device receiving a message from an authentication server, indicating that the network access via a first wireless carrier is denied. At block 1004, in one embodiment, the user device identifies the next wireless carrier in a preferred carrier list stored in memory of the user device. In another embodiment, the user device sends a request to the rule server to identify a preferred wireless carrier.

At block 1006, the user device obtains the device profile for the identified wireless carrier (from local memory or from the rule server). At block 1008, the user device reprograms the modem with the obtained device profile. At block 1010, the user device power cycles the modem to implement the obtained device profile and connects to the network using the obtained device profile.

Figure 11:
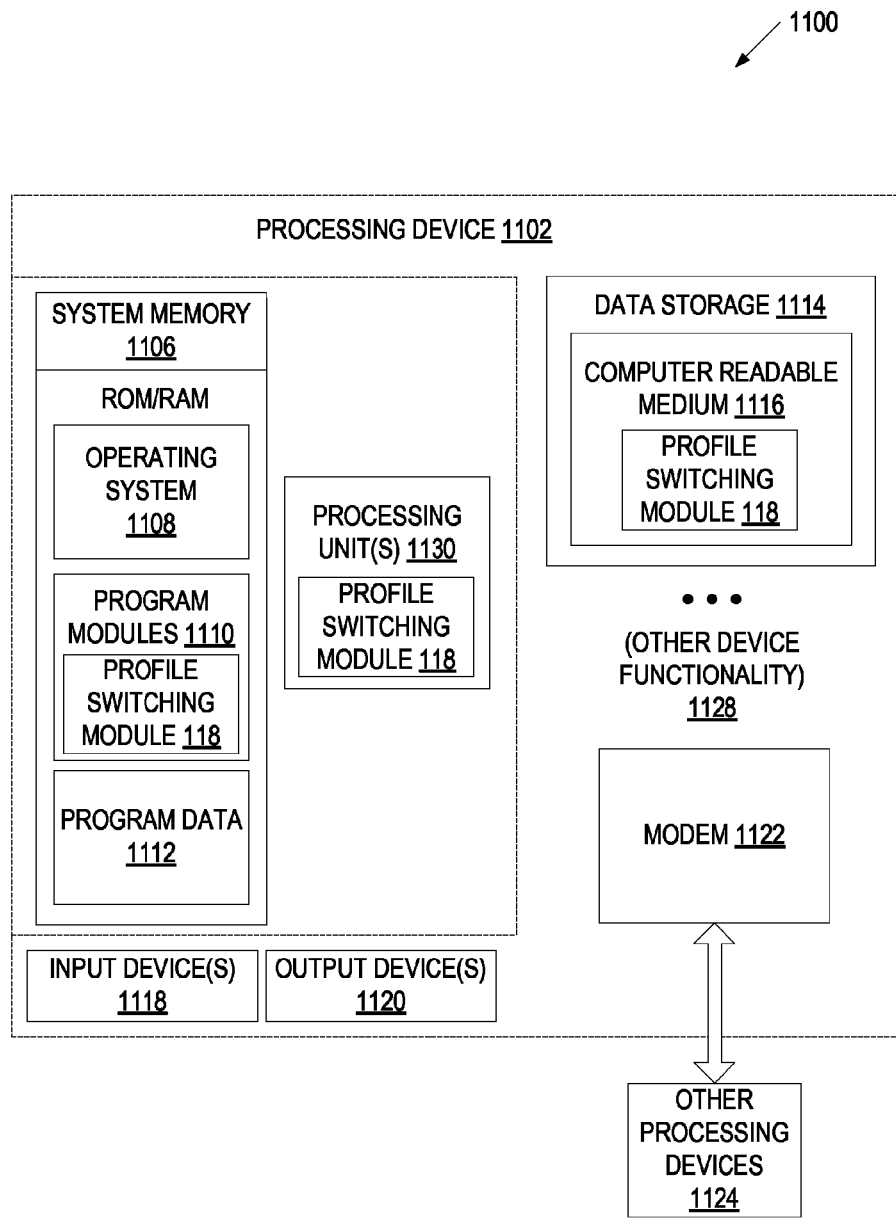
FIG. 11 is a block diagram illustrating an exemplary user device.

FIG. 11 is a block diagram illustrating an exemplary user device 1100. The user device 1100 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 1100 includes one or more processing units 1104, such as one or more CPUs. The user device 1100 also includes system memory 1106, which may correspond to any combination of volatile and/or non-volatile storage mechanisms. The system memory 1106 may store information which provides an operating system component 1108, various program modules 1110 including the profile switching module 118, program data 1112, and/or other components. The user device 1100 performs functions by using the processing unit(s) 1104 to execute the profile switching module 118 and other instructions provided by the system memory 1106.

The user device 1100 may also include a data storage device 1114 that may consist of one or more types of removable storage and/or one or more types of non-removal storage. The data storage device 1114 may include a computer-readable medium 1116 on which is stored one or more sets of instructions (e.g., instructions of the profile switching module 118) embodying any one or more of the methodologies or functions described herein. As shown, instructions of the profile switching module 118 may also reside, completely or at least partially, within the system memory 1106 and/or within the processing unit(s) 1130 during execution thereof by the user device 1100, the system memory 1106 and the processing unit(s) 1130 also constituting computer-readable media. The instructions of the profile switching module 118 may further be transmitted or received over a network.

The user device 1100 may also include one or more input devices 1118 (keyboard, mouse device, specialized selection keys, etc.) and one or more output devices 1120 (displays, printers, audio output mechanisms, etc.). The user device 1100 may further include a wireless modem 1122 to allow the user device 1100 to communicate via a wireless network with other computing devices 1124, such as remote computers, the item providing system, and so forth. The wireless modem 1122 may allow the user device 1100 to receive a telephone ring and also communicate with the item providing system in a data mode. The wireless modem 1122 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, etc.

The above-enumerated list of modules is representative and is not exhaustive of the types of functions performed by the user device 1100. As indicated by the label "Other Device Functionality" 1128, the user device 1100 may include additional functions.

Figure 12:
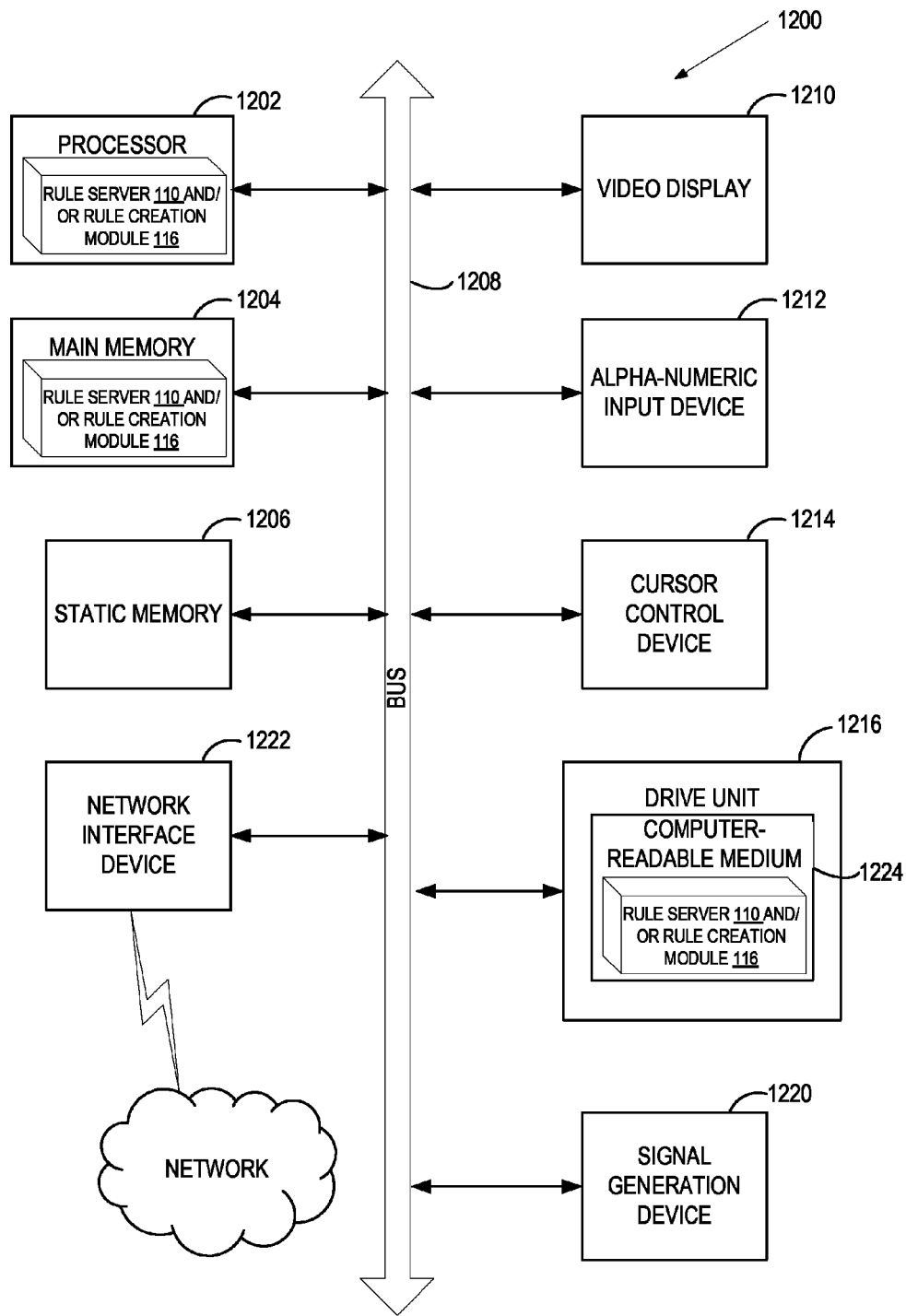
FIG. 12 is a block diagram illustrating an exemplary server computing system such as an item providing system or a communication enabling system.

FIG. 12 illustrates an exemplary server system 1200, such as an item providing system or a communication enabling system, in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing system (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1216, which communicate with each other via a bus 1206.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets.

The processor 1202 may also be one or more special-purpose processing devices such as an application specific integrated circuit (ASIC), a field programmable gate array (FPGA), a digital signal processor (DSP), network processor, or the like. The processor 1202 is configured to execute the rule server 110 and/or rule creation module 116 for performing the operations and steps discussed herein.

The computer system 1200 may further include a network interface device 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker).

The data storage device 1216 may include a computer-readable medium 1224 on which is stored one or more sets of instructions (instructions of rule server 110 and/or rule creation module 116) embodying any one or more of the methodologies or functions described herein. The rule server 110 and/or rule creation module 116 may also reside, completely or at least partially, within the main memory 1204 and/or within the processor 1202 during execution thereof by the computer system 1200, the main memory 1204 and the processor 1202 also constituting computer-readable media. The rule server 110 and/or rule creation module 116 may further be transmitted or received over a network 1220 via the network interface device 1222.

While the computer-readable storage medium 1224 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting", "identifying", "sending", "recording" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a server computing system, the method comprising:
    detecting, by the server computing system, a condition associated with a switch of a home network from a current wireless carrier to a specified wireless carrier;
    identifying, by the server computing system, a user device to which the condition applies; and
    responsive to identifying the user device to which the condition applies,
        sending, by the server computing system, a message to the user device while the user device is connected to the current wireless carrier, the message indicating the switch to the specified wireless carrier; and
        sending, by the server computing system, a device profile for the specified wireless carrier to the user device, the device profile comprising a subscriber identity module (SIM) profile and a modem profile for the specified wireless carrier, the SIM profile defining a new unique international mobile subscriber identity (IMSI) associated with the specified wireless carrier that will replace a current IMSI associated with the current wireless carrier.

2. The method of claim 1 wherein the message includes the device profile for the specified wireless carrier.

3. The method of claim 1 wherein the SIM profile defines settings for the specified wireless carrier, the settings comprising at least one of security authentication, ciphering information or a list of services accessible to users.

4. The method of claim 1 wherein the modem profile defines connection parameters for the specified wireless carrier, the connection parameters comprising at least one of a frequency band or a format for presenting a name of the specified wireless carrier on the user device.

5. The method of claim 1 wherein the condition is defined by a rule that is based on at least one of a performance characteristic of the specified wireless carrier and a cost characteristic of the specified wireless carrier.

6. The method of claim 1 further comprising: recording the message in a message data store.

7. The method of claim 1 wherein detecting the condition associated with a switch to the specified wireless carrier comprises:
  detecting a change in a location of the user device;
  identifying one or more rules applicable to a new location of the user device; and
  determining that one of the identified rules indicates the switch to the specified wireless carrier.

8. The method of claim 1 further comprising:
  receiving a response of the user device to the message, the response indicating that the switch to the specified wireless carrier is undesirable;
  determining whether any rule provides an alternative wireless carrier for switching;
  if any rule provides the alternative wireless carrier for switching, sending a second message to the user device, the second message indicating a switch to the alternative wireless carrier; and
  if no rules provide the alternative wireless carrier for switching, sending a third message to the user device, the third message insisting that the switch to the specified wireless carrier be performed.

9. The method of claim 1 wherein the user device comprises an electronic book reader device.

10. A method, implemented by a server computer system comprising:
  collecting, by the server computer system, carrier-specific performance characteristics for each of a plurality of wireless carriers and carrier-specific cost characteristics for each of the plurality of wireless carriers;
  collecting, by the server computer system, device-specific performance characteristics pertaining to wireless carrier usage by a user device, the device-specific performance characteristics comprising network characteristics at a plurality of prior locations of the user device;
  creating, by the server computer system, a plurality of rules for the user device based on the carrier-specific performance characteristics, the device-specific performance characteristics, and the carrier-specific cost characteristics, each of the plurality of rules indicating a switch by the user device from a current wireless carrier to a different wireless carrier when one or more conditions of a corresponding rule are satisfied, wherein the switch causes a home network of the user device to change to the different wireless carrier based on a subscriber identity module (SIM) profile that defines a new unique international mobile subscriber identity (IMSI) associated with the different wireless carrier; and
  storing the plurality of rules in a rules data store, wherein the server computer system sends a message to the user device while the user device is connected to the current wireless carrier, the message indicating a switch to the different wireless carrier and comprising the SIM profile and a modem profile for the different wireless carrier.

11. The method of claim 10 wherein the user device is an electronic book reader device.

12. The method of claim 10 wherein the performance characteristics associated with the plurality of wireless carriers pertain to at least one of a throughput and a signal quality.

13. The method of claim 10 wherein the cost characteristics pertain to a rate charged by a respective wireless carrier for providing network connection for the user device.

14. The method of claim 10 further comprising periodically updating the plurality of rules based on newly collected performance and cost characteristics of the plurality of wireless carriers.

15. The method of claim 10 further comprising:
  distributing the plurality of rules to a communication enabling system; and
  distributing a subset of the plurality of rules to a plurality of user devices.

16. A non-transitory computer readable storage medium including instructions that, when executed by a processing system, cause the processing system to perform operations comprising:
  detecting, by the processing system, a condition pertaining to a switch of a user device from a first wireless carrier to a second wireless carrier while the user device is connected to the first wireless carrier;
  obtaining, by the processing system, a subscriber identity module (SIM) profile and a modem profile associated with the second wireless carrier, the SIM profile defining a new unique international mobile subscriber identity (IMSI) associated with the second wireless carrier that will replace a current IMSI associated with the first wireless carrier;
  reprogramming a modem of the user device using the SIM profile and the modem profile associated with the second wireless carrier, wherein the reprogramming causes a home network of the user device to switch from the first wireless carrier to the second wireless carrier; and
  establishing a network connection for the user device using the SIM profile and the modem profile associated with the second wireless carrier.

17. The computer readable storage medium of claim 16 wherein the SIM profile defines settings for the second wireless carrier, the settings comprising at least one of security authentication, ciphering information or a list of services accessible to users.

18. The computer readable storage medium of claim 16 wherein the modem profile defines connection parameters for the second wireless carrier, the connection parameters comprising at least one of a frequency band or a format for presenting a name of the second wireless carrier on the user device.

19. The computer readable storage medium of claim 16 wherein the user device is an electronic book reader device.

20. The computer readable storage medium of claim 16 wherein obtaining the SIM profile and the modem profile associated with the second wireless carrier comprises:
  sending a request for the SIM profile and the modem profile associated with the second wireless carrier to a server; and
  receiving the SIM profile and the modem profile associated with the second wireless carrier from the server.

21. The computer readable storage medium of claim 16 wherein obtaining the SIM profile and the modem profile associated with the second wireless carrier comprises:
retrieving the SIM profile and the modem profile associated with the second wireless carrier from secure memory on the modem.

22. The computer readable storage medium of claim 16 wherein the condition is any one of a change in a location of the user device, a message indicating that the user device is denied network access via the first wireless carrier, and a change in a network access performance characteristic.

23. A server computing system comprising:
a memory;
a processor, coupled to the memory; and
a rule server, executed from the memory by the processor, to:
detect a condition associated with a switch of a home network from a current wireless carrier to a specified wireless carrier, the condition pertaining to a user device; and
in response to detecting the condition associated with the switch,
send a message to the user device to indicate the switch to the specified wireless carrier while the user device is connected to the current wireless carrier; and
send a device profile for the specified wireless carrier to the user device, the device profile comprising a subscriber identity module (SIM) profile and a modem profile for the specified wireless carrier, the SIM profile defining a new unique international mobile subscriber identity (IMSI) associated with the specified wireless carrier that will replace a current IMSI associated with the current wireless carrier.

24. The system of claim 23 wherein the message includes the device profile for the specified wireless carrier.

25. The system of claim 24 wherein the SIM profile defines settings for the specified wireless carrier, the settings comprising at least one of security authentication, ciphering information or a list of services accessible to users.

26. The system of claim 23 wherein the condition is defined by a rule that is based on at least one of a performance characteristic of the specified wireless carrier and a cost characteristic of the specified wireless carrier.

27. The system of claim 23 wherein the rule server is to detect the condition associated with the switch to the specified wireless carrier by:
detecting a change in a location of the user device;
identifying one or more rules applicable to a new location of the user device; and
determining that one of the identified rules indicates a switch to the specified wireless carrier.

28. The system of claim 23 wherein the rule server is further to:
receive a response of the user device to the message, the response indicating that the switch to the specified wireless carrier is undesirable;
determine whether any rule provides an alternative wireless carrier for switching;
if any rule provides the alternative wireless carrier for switching, send a second message to the user device, the second message requesting a switch to the alternative wireless carrier; and
if no rules provide the alternative wireless carrier for switching, send a third message to the user device, the third message insisting that the switch to the specified wireless carrier be performed.

29. The system method of claim 23 wherein the user device comprises an electronic book reader device.

* * * * *